(12) United States Patent
Filev

(10) Patent No.: US 7,171,394 B2
(45) Date of Patent: Jan. 30, 2007

(54) GLOBAL PAINT PROCESS OPTIMIZATION

(75) Inventor: Dimitar Filev, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 398 days.

(21) Appl. No.: 10/696,789

(22) Filed: Oct. 30, 2003

(65) Prior Publication Data

US 2005/0096796 A1    May 5, 2005

(51) Int. Cl.
- *G06E 1/00* (2006.01)
- *G06E 3/00* (2006.01)
- *G06F 15/18* (2006.01)
- *G06G 7/00* (2006.01)

(52) U.S. Cl. .................. 706/19; 706/23; 706/903; 706/904; 706/906

(58) Field of Classification Search .............. 706/19, 706/23, 903–906
See application file for complete search history.

(56) References Cited

U.S. PATENT DOCUMENTS

| | | | |
|---|---|---|---|
| 4,912,653 A | | 3/1990 | Wood |
| 5,315,306 A | * | 5/1994 | Doughty et al. ............ 342/192 |
| 5,976,612 A | * | 11/1999 | Tardoni ........................ 427/8 |
| 6,146,264 A | | 11/2000 | Tong et al. |
| 6,226,568 B1 | | 5/2001 | Tong et al. |
| 6,507,803 B1 | * | 1/2003 | Eickmeyer et al. ............ 706/15 |
| 6,528,109 B1 | | 3/2003 | Filev et al. |
| 6,714,924 B1 | * | 3/2004 | McClanahan ................. 706/15 |
| 6,745,158 B1 | * | 6/2004 | Eickmeyer et al. ............ 706/23 |
| 6,804,390 B2 | * | 10/2004 | McClanahan ................ 382/156 |
| 6,816,756 B2 | * | 11/2004 | Shin et al. ................... 700/283 |
| 2002/0122033 A1 | * | 9/2002 | Rupieper et al. ............ 345/419 |

OTHER PUBLICATIONS

Filev, D. "Applied Intelligent Control—Control of Automotive Paint Process". Aug. 2002.*

Kumar, A and Hand, VC. "Feasibility of Using Neural Networks and Genetic Algorithms to Predict and Optimize Coated Paper and Board Brightness". Nov. 2000.*

Guessasma,S and Montavon, G and Coddet, C. "On the Implement of Neural Network Concept to Optimize thermal Spray Deposition Process"—Abstract. Nov. 2001.*

* cited by examiner

*Primary Examiner*—David Vincent
*Assistant Examiner*—Benjamin Buss
(74) *Attorney, Agent, or Firm*—Brooks Kushman P.C.; Damian Porcari

(57) ABSTRACT

The present invention provides a method of optimizing a painting process for applying a paint layer on an article. The method comprises defining a functional relationship paint processing parameters and a paint layer property (i.e., the average paint layer thickness) using a neural network. This functional relationship is then used in a paint optimization function that measures a combination of quality control parameters and efficiency parameters. Finally, the paint optimization function is optimized by adjusting the paint processing parameters utilizing the functional relationship formed by the neural network. The invention also provides a system that implements the methods of the invention.

20 Claims, 6 Drawing Sheets

GLOBAL PAINT PROCESS OPTIMIZATION

BACKGROUND OF THE INVENTION

1. Field of the Invention

In at least one aspect, the present invention relates to methods of optimizing a painting process by establishing a functional relationship between paint process parameters and the resulting paint layer using neural networks.

2. Background Art

The process of painting a vehicle body on a moving conveyor line is extremely complex. The number of possible factors that effect the overall process (inputs) and the number of measurable characteristics of the paint finish (outputs) are in the range of thousands. Furthermore, this high volume/large scale process is under considerable disturbances (variations in environmental parameters, paint parameters, and equipment). The lack of reasonable quantitative description of the relationship between the main components of this complex system has led to development of local controls that only control individual sub-systems or groups of process variables rather than the overall process. Modern automotive paint process controls have partially overcome the inertia of sub-system-based thinking and offer more global control mechanisms that open the door to control and optimization of the entire automotive paint process.

Paint control systems have been developed to control the air flow in the paint booth (i.e., an Air Flow Paint Booth Control System) and to control the quality of the paint layer applied to a vehicle (i.e., an Integrated Paint Quality Control System.) U.S. Pat. Nos. 6,226,568 and 6,146,264 disclose such air flow booth control systems. The first, the Air Flow Paint Booth Control System, regulates the air flows in the paint booth. Consistent air flow is important to the painting process because it strongly influences the efficiency of the paint application, affects paint quality, and impacts energy consumption, worker health and safety. An automotive paint booth consists of several interconnected rooms (called zones) that form a semi-open environment with a conveyor transporting the vehicle body through the respective zones where different parts of the painting process are performed. Air supplied to the booth through multiple supply fans and ducts is used in the booth to remove paint over spray from the booth. From a system perspective the air flows in the paint booth form a highly coupled multi-variable system. Ford's patented feedback control system uses the air velocity measurements from acoustic anemometers to determine changes to control variables (supply fan speeds and/or dampers in the duct work) that regulate the down/cross flows between the process zones.

The Integrated Paint Quality Control System is an automatic spray booth control system that integrates paint automation and paint film thickness measurements into a closed loop feedback control system, which reduces paint process variability and produces consistent, high quality paint finishes. U.S. Pat. No. 6,528,109 discloses such an integrated paint quality control system. Generally, paint film thickness is considered one of the main factors that determine overall paint quality. Surprisingly enough, in a typical paint shop with a high level of control and automation, including dozens of process controllers, PLCs, sensors, robotic devices, automated applicators, etc., the film thickness is measured occasionally on 2–3 vehicles per shift. Evidently, this data is not enough to control and optimize process performance taking into account the variety of possible combinations of colors, styles, and spray booths. In addition, process data is spread out on different systems in the paint shop that makes it hard to correlate process parameters to the resulting paint quality. As a result of this, decisions for determining applicator parameters are usually late and subjective.

From the discussion above, it is evident that an Air Flow Paint Booth Control System is used to determine the efficiency of utilizing the paint while an Integrated Paint Quality Control System is most closely related to determining the film thickness. Although it may seem plausible that these two systems can be decoupled, in reality, such decoupling is rather unrealistic and may lead to an inefficient paint process with an undesirable increase in paint usage. This occurs because the down flows in the spray booth determine a natural film thickness that is a function of the air down flow component for a given flow rate of the paint spray. For higher values of the air downdraft this component may not compensate by manipulating the fluid flows resulting in an essentially uncontrollable overall system. Moreover, it is well known that by properly selecting the airflows the process transfer efficiency can be significantly impacted.

Accordingly, there exists a need in the prior art for improved methods and systems of optimizing paint transfer efficiency while simultaneously improving painting quality control.

SUMMARY OF THE INVENTION

The present invention overcomes the problems in the prior art by providing in one embodiment a method of optimizing a painting process for applying a paint layer on an article. The method comprises defining a functional relationship between paint processing parameters and a paint layer property (i.e., the average paint layer thickness) using a neural network. This functional relationship is then used in a paint optimization function that measures a combination of quality control parameters and paint transfer efficiency. Finally, the paint optimization function is optimized by adjusting the paint processing parameters utilizing the functional relationship formed by the neural network ("NN"). The method of the invention is advantageously used to establish a global model of the paint process that can be used to predict for a given combination of environmental factors such as down draft (at the bell zone and reciprocator zone), air temperature, and air humidity, and average fluid flow rate the average film thickness on a particular surface of the vehicle body. This prediction is further used to calculate the optimal average fluid flow rates for the left, vertical and horizontal bells, and the optimal down drafts in the bell and reciprocator zones. Accordingly, the methods of the invention can be used to predict the impact of different combinations of process parameters on the final film thickness.

In another embodiment of the invention, a system for optimizing a painting process using the methods of the invention is provided. The system of this embodiment comprises a computer that is configured to define a functional relationship with a neural network having one or more neural layers between the set of paint processing parameters and a paint layer property. Additionally, the computer used in the system of the invention is further configured to optimize a paint optimization function that measures the efficiency of the painting process by adjusting the one or more paint processing parameters, the paint optimization function being a function of the paint layer property.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1A:
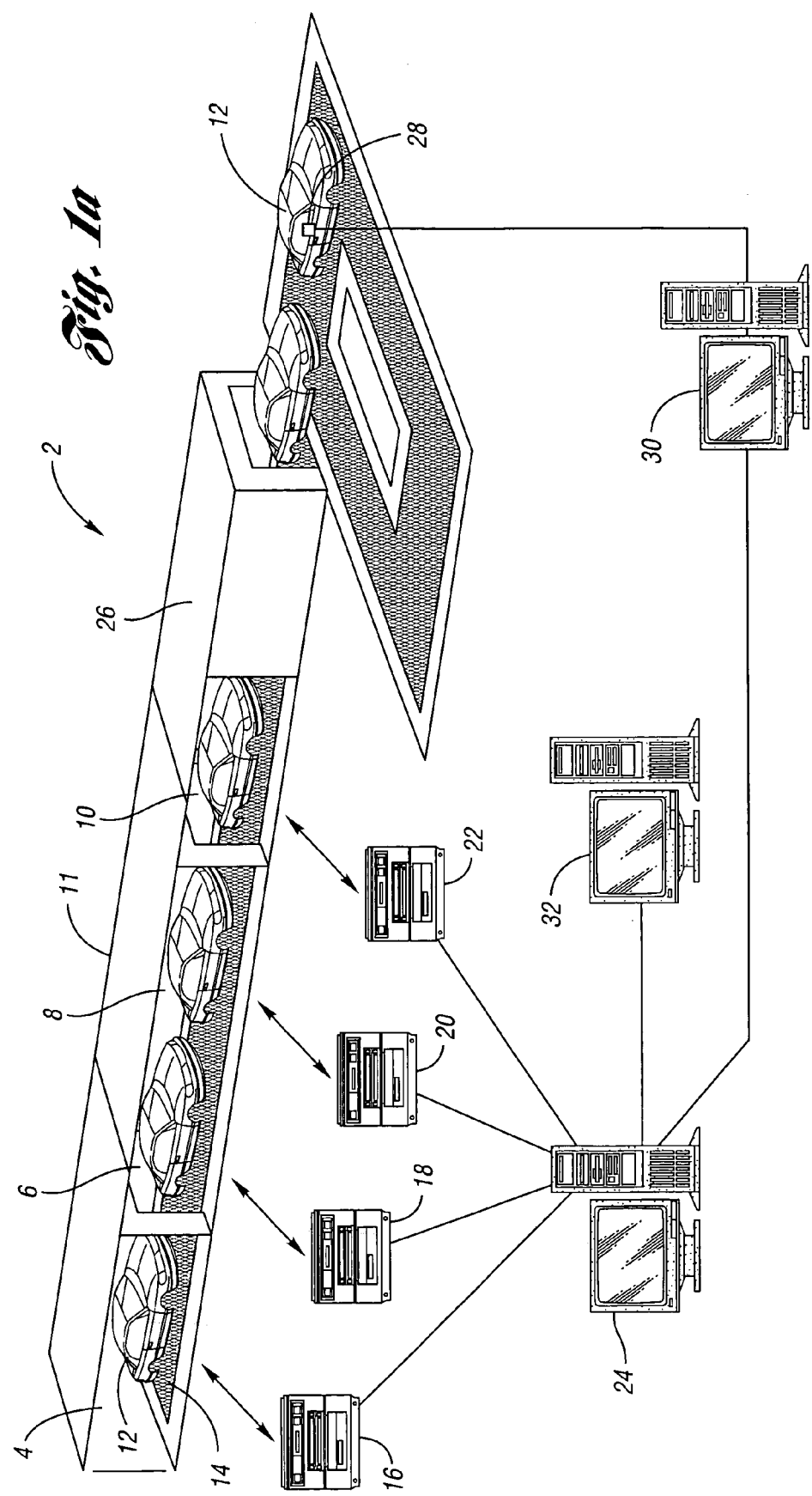
FIG. 1A is a schematic of an integrated paint quality system.
Figure 1B:
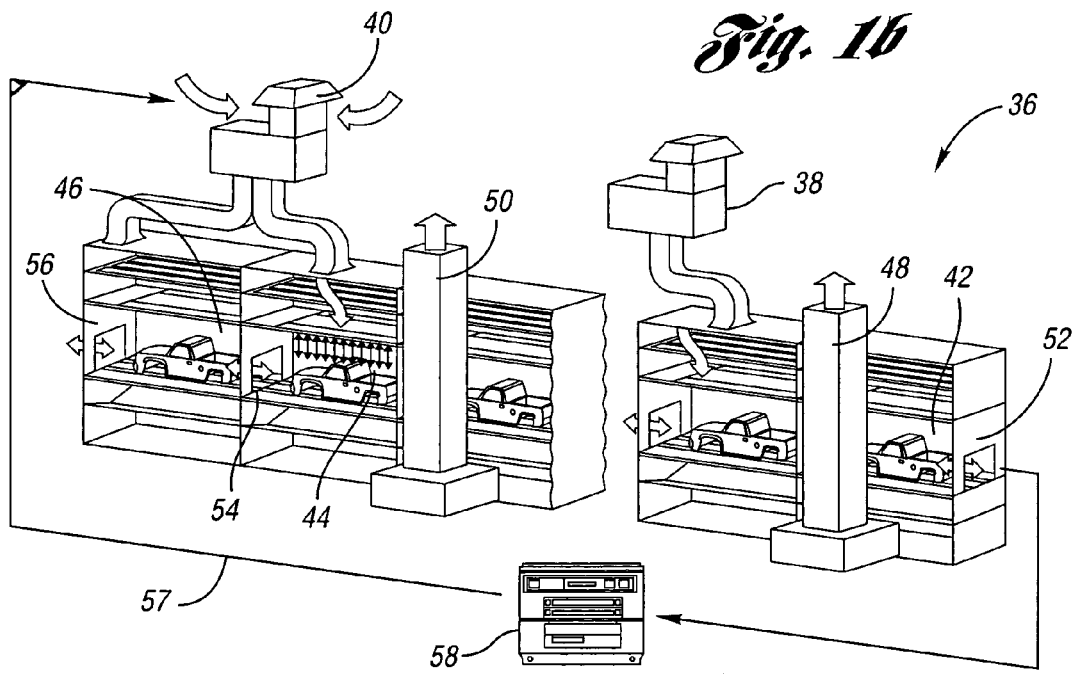
FIG. 1B is a schematic of an air flow booth control system.

In an embodiment of the present invention, a method of globally optimizing a paint process for applying a paint layer on an article and in particular a vehicle is provided. The global optimization includes a simultaneous optimization of both an integrated paint quality control ("IPQC") system and an air flow booth control system. U.S. Pat. No. 6,528,109 discloses such an integrated paint quality control system. Similarly, U.S. Pat. Nos. 6,226,568 and 6,146,264 disclose air flow booth control systems. The entire disclosure of each of these patents is hereby incorporated by reference. With reference to FIG. 1A a schematic of an integrated paint quality control system ("IPQC") is provided. Integrated paint quality control system 2 includes spray zones 4, 6, 8, 10 in which paint is applied to vehicle 12 transported through paint spray line 11 on conveyor 14. The application of paint is controlled by PLCs 16, 18, 20, 22 which are in turn monitored and controlled by quality control system 24. The painted vehicles are dried in oven 26. Upon emerging from the spray line 2, the quality of the painted layer is accessed by sensors at location 28 which are controlled by computer 30. Feedback control is monitored and controlled via feedback control system 32. With reference to FIG. 1B a schematic of an air flow booth control system is provided. Air flow booth control system 36 include blowers 38, 40 which introduces a down draft into zones 42, 44, 46 the flowing air is removed via ducts 48, 50. Acoustic sensors are located at positions 52, 54, 56. Feedback control from the acoustic sensors is provided via feedback loop 57 with feedback controller 58.

It can be appreciated that the painting process is controlled by a set of adjustable paint processing parameters. The method of this embodiment comprises defining a functional relationship with a neural network between the set of paint processing parameters and a paint layer property. The neural network is characterized as having one or more neural layers that comprise a plurality of neural units that have a plurality of neural network parameters. A paint optimization function is then formed that measures the quality and efficiency of the painting process. The paint optimization function is necessarily a function of the paint layer properties and the paint processing parameters. Finally, the paint optimization function is optimized by adjusting the one or more paint processing parameters utilizing the functional relationship defined by the neural network.

Figure 2:
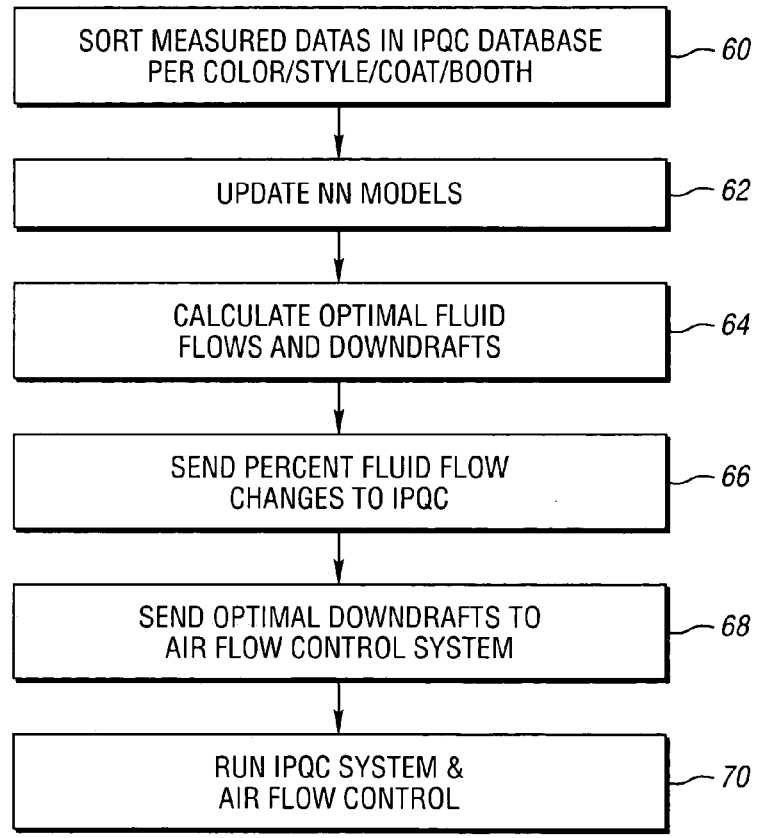
FIG. 2 is a flow chart of the global optimization method of the invention.

A flow chart of the global optimization method of the invention is shown in FIG. 2. In step 60 measured data is sorted with respect to color, automobile style, coat properties, and spray booth. This data is then utilized in step 62 to establish the functional relationships with the neural network ("NN"). Next the optimization is performed in step 64. In particular, optimal fluid flows and downdrafts are calculated. Next, these optimal values for the paint process parameters are sent to the IPQC to adjust the film quality in step 66. Similarly, the optimal values are sent to the Air Flow Control System in step 68. These optimal values are then implemented to improve the paint process in step 70.

The step of forming the functional relationship by the neural network is essentially a feedback control algorithm. It is based on indirect adaptive control strategy in which mathematical models for each combination of color, style, and coating are recursively learned. These mathematical models are further used to calculate the optimal adjustment of the paint processing parameters through a constrained optimization procedure used in the optimization step (see discussion below.) The feedback control system works in supervisory control mode, i.e., it does not interfere with the local paint automation and process zone controllers but optimizes overall paint process performance by automatically adjusting the targets of the local controllers until desired paint layer properties are achieved. The preferred paint layer properties are the paint film thickness, appearance, or a combination of both. The functional relationship between the paint processing parameters and a paint layer property is established by obtaining a plurality of groups of values $P_k$ for the set of paint processing parameters and a value V for the paint layer property for each of the plurality of groups of values $P_k$. As used herein, k is an index number for each of the paint processing parameters with values from 1 to the number of processing parameters. Next, each of the plurality of groups of values $P_k$ for the set of paint processing parameters are operated with the neural network to provide an output O for each of the plurality of groups of values $P_k$. Finally, the plurality of neural network parameters are adjusted to minimize the differences between the output O and the value V for each of the one or more groups of values for a set of paint processing parameters. The step of operating on each of the plurality of groups of values $P_k$ and the step of adjusting the plurality of neural network parameters is performed on a computer.

Figure 3:
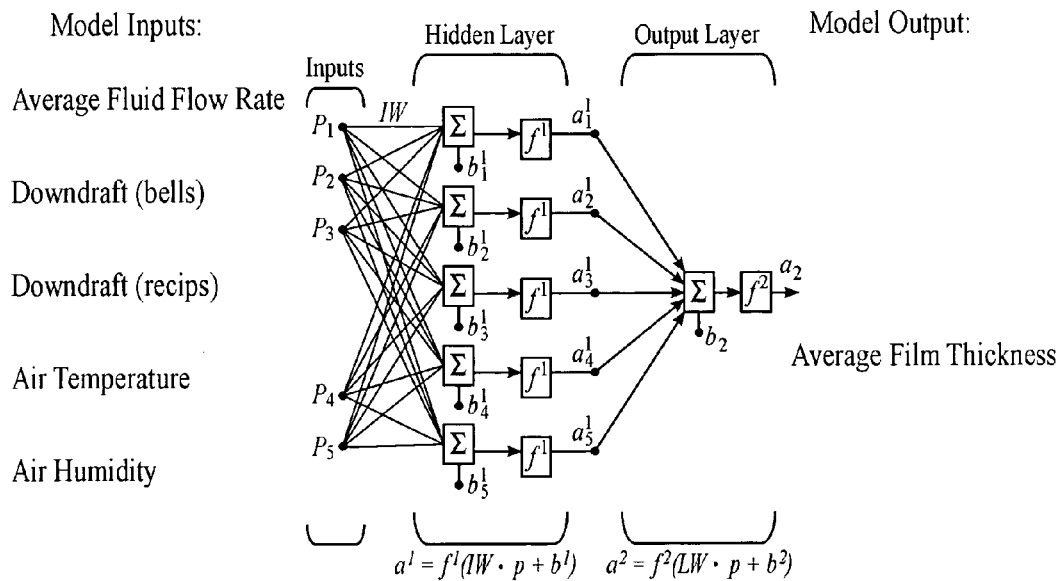
FIG. 3 is a schematic of the neural network layers used in this embodiment.

In a preferred embodiment of the invention, the neural network operates on a plurality of groups of values $P_k$ through a first neural layer defined by equation 1 to give a first set of outputs $a_i$:

$$a_i = f^1(W^1_{i,k} P_k + b^1_i) \qquad 1$$

the outputs $a_i$ being operated on by a second neural layer defined by equation 2 to give outputs O:

$$O = f^2(W^2_{j,k} P_k + b^2_j) \qquad 2$$

wherein $f^1$ is a transfer function for the first neural layer, $f^2$ is a transfer function for the second neural layer, i is an index number with values from 1 to the number of neurons in the first neural layer, j is an index number with values from 1 to the number of neurons in the second neural layer, $W^1_{i,k}$ are adjustable neural network parameters for the first layer, $W^2_{i,k}$ are adjustable neural network parameters for the second neural layer, $b^1_i$ are bias factors for the first neural layer, and $b^2_j$ are bias factors for the second neural layer. Suitable neural network algorithms are available in MATLAB™ available from The Mathworks, Inc. In the examples provided below, the hyperbolic tangent transfer function was used. FIG. 3 provides a schematic of the neural network layers used in this embodiment. In this figure IW is $a_i$, $a_2$ is 0, IW is $W^1_{i,k}$, and LW is $W^2_{j,k}$.

Figure 4A:
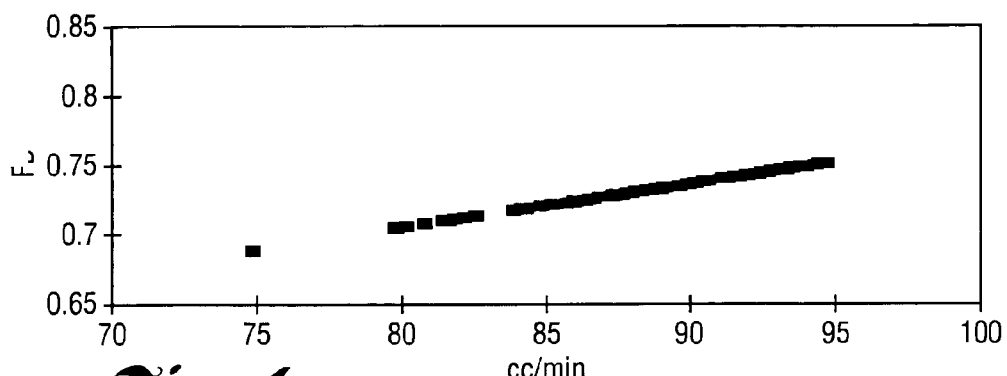
FIG. 4A is a plot of the film build versus the paint flow rate for the left side of a vehicle.
Figure 4B:
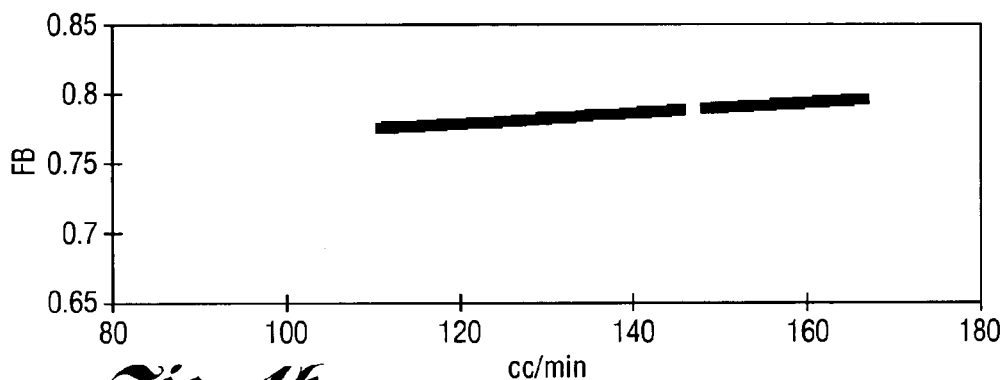
FIG. 4B is a plot of the film build versus the paint flow rate for the top surfaces of a vehicle.
Figure 4C:
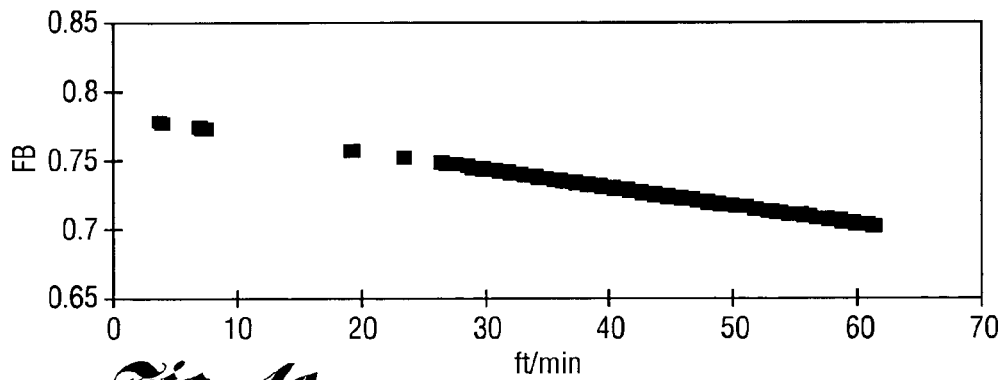
FIG. 4C is a plot of the film build versus the down draft for the left side of a vehicle.
Figure 4D:
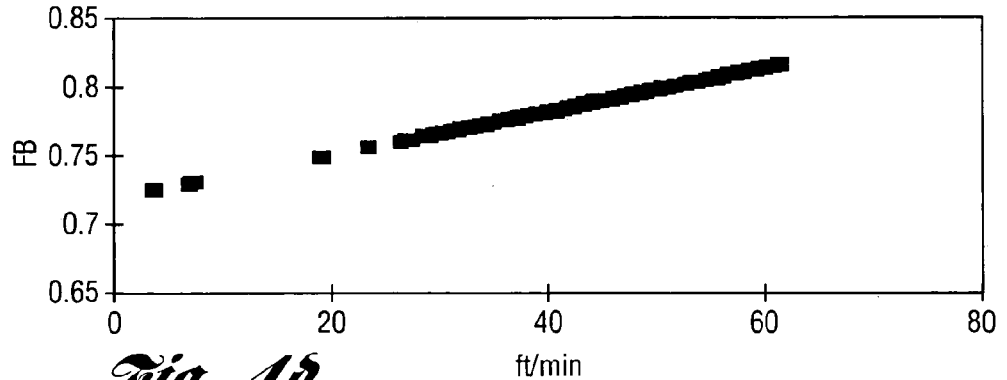
FIG. 4D is a plot of the film build versus the down draft for the top surfaces of a vehicle.

Of particular consideration when creating the functional relationship is the differing effect of the downdraft on horizontal and vertical surfaces of the vehicle to be painted. FIGS. 4A and 4B provide a plot of the film build versus the paint flow rate. FB in FIG. 4 means film build. Accordingly, sometimes herein the term "film build" will be used for "film thickness." FIG. 4A provides such a plot for the left side of a vehicle and FIG. 4B for the horizontal surfaces. These figures demonstrate that the film build increase as the amount of paint sprayed increases. FIGS. 4C and 4D provide plots of the film build versus down draft flows. FIG. 4C demonstrates that for a given paint flow, the film build decreases as the down draft flow increases for a vertical surface such as the left side of the vehicle. The decreasing thickness is undoubtedly due to paint being transported away from the vehicle by the down draft. In contrast, FIG. 4D shows the opposite affect for the horizontal surfaces. This latter observation is most likely due to the down draft forcing more paint down on a vertical surface. These differences, are accounted for by the functional relationship established by the neural network as follows. Three function relationships for the film build are created: one for the vehicle right side, one for the vehicle left side, and one for the vehicle top. These are symbolically expressed as:

$$FB_L = f_L(FF_L, DDB, DD_R, T, H)$$

$$FB_R = f_R(FF_R, DDB, DD_R, T, H)$$

$$FB_T = f_T(FF_T, DDB, DD_R, T, H) \quad (3)$$

where $FB_L$ is the film build on the left side of a vehicle; $FB_R$ is the film build on the right side of the vehicle; $FB_T$ is the film build on the top surfaces, $f_L$ symbolizes the functional relationship for the left side established by the neural network; $f_R$ symbolizes the functional relationship for the right side established by the neural network; $f_T$ symbolizes the functional relationship for the top surfaces established by the neural network; $FF_L$ is the paint fluid flow applied to the left side; $FF_R$ is the paint fluid flow applied to the right side; $FF_T$ is the paint fluid flow applied to the top surface; T is the temperature in the spray booth; and H is the humidity in the spray booth. In establishing these functional relationships, the average film thickness is obtained by averaging the film thicknesses on each surface. Similarly, the average flow rate is the average of the flow rates of all bells that impact a particular surface. The reason for using the averages rather than the vector of actual values is to reduce the number of model inputs and outputs and thus the parameters of the model. However, this model does not include the shaping air as an input variable for two reasons. First, the shaping air affects mostly the overlap of the bell patterns and therefore paint uniformity but has less overall effect on the paint film thickness compared to the flow rate. Secondly, while the relationship between the fluid flow and the film thickness is monotonic, and therefore the relationship between the averages can be considered as a rough approximation of the relationship between the actual values, in the case of shaping air the relationship of its average to the average film thickness can significantly differ from the relationship between their actual values.

The method of the present invention optimizes the paint process by establishing a process function that includes both paint uniformity and transfer efficiency. The concept of global process optimization is based on the assumption of a global process model that includes all major components of both control systems. During implementation of the methods of the invention, a number of paint processing parameters are varied both in the step of defining a functional relationship with a neural network between the set of paint processing parameters and a paint layer property and in the step of optimizing the optimization function. Potential parameters include, for example, applicator parameters, environmental parameters, applicator position parameters, paint material parameters, and combinations thereof. Examples of applicator parameters include fluid flow rates, shaping air flow rates, bell speeds, high voltage setting, and combinations thereof. Bell speed significantly impacts transfer efficiency and paint film thickness. Since its variation may also have effect on the color and on the bell life it is kept unchanged after the process launch. Another reason for excluding the bell speed, as a potential candidate for process control is the fact that in most paint automation systems bell speed cannot change between the flow zones along the vehicle body. High voltage is not considered for process control for a similar reason. High voltage zones along the vehicle body do not coincide with the flow zones. High voltage is initially optimized and kept constant during normal operating conditions. Examples of environmental parameters include air downdrafts in the reciprocator zones, air downdrafts in the bell zone, air temperature, air humidity, and combinations thereof. Examples of applicator position parameters include target distance, angle to target, bell position, oscillation speed, oscillation stroke, bell separation, and combinations thereof. Although the applicator position parameters have a substantial effect on the paint film, these parameters are not as useful for process optimization since these parameters are initially optimized during the process launch in order to achieve a satisfactory coverage and proper overlap. Accordingly, these parameters remain usually unchanged during production. Examples of paint material properties include paint viscosity, paint temperature, paint resistivity, and combinations thereof. Paint material properties affect material properties (viscosity, temperature and resistivity). Normally these parameters remain constant in most paint facilities and do not change dramatically over time under normal operating conditions. Changes of these parameters are not desirable since they may result in paint defects rather than improving paint appearance and transfer efficiency. It has been found that the following parameters are particularly well suited to be adjusted in the method of the present invention: average fluid flow rate, downdrafts at the bell zones, downdrafts at the reciprocator zones, air temperature, air humidity, and combinations thereof.

The global model approximates the relationship between these process variable and paint film thickness on the vehicle body. Accordingly, the optimization function is given by equation 4:

$$J = \alpha \Sigma (FB - FT)^2 + (1-\alpha)(\Sigma FF/\Sigma FB) \quad (4)$$

wherein FB is the average film build (thickness) as calculated from the neural network, FT is a target average film build, FF is the amount of paint sprayed, and $\alpha$ is a weighting factor with a value between 0 and 1. The $\Sigma$ signifies that a summation is to be done. It will be recognized that equation 4 has two components. The first component which is weighted by $\alpha$ relates to the quality of the paint layer in being able to achieve a targeted thickness. The second component which is weighted by $(1-\alpha)$ relates to the efficiency of the process since the sum of the fluid flows (FF) is divided by the sum of the thicknesses predicted by the neural network. In this embodiment, the functional dependency of FF is established as set forth above by a determination of the adjusted neural network parameters. It should be appreciated that FT will have three components that are summed: one for the right side of a vehicle, one for the left side of a vehicle, and one for the top (i.e., the horizontal surfaces) of a vehicle. There are also three functional relations for FF as set forth above in equation 3. Similarly FB will have three components corresponding the paint flow from the left spray gun, the right spray gun, and the top spray gun. A suitable constrained optimization algorithm is the FMINCON function in MATLAB™ available from The Mathworks, Inc. FMINCON finds a constrained minimum of a function of several variables by solving the nonlinear programming problem of the form:

$$\min_X F(X)$$

subject to:
A*X<=B, Aeq*X=Beq (linear constraints)
C(X)<=0, Ceq(X)=0 (nonlinear constraints)
LB<=X<=UB (lower and upper bounds)

Paint process parameters are typically constrained because the process equipment is not physically incapable of attaining every imaginable value for a given parameter. Moreover, some process parameters are mandated by governmental regulation to be within a certain range. For example, minimal down draft values in the paint booths must be about 40–50 ft/min (linear flow rate.) Table 1 provides a summary of the parameter ranges used in the examples in the present application.

TABLE 1

Parameter ranges

| Parameter | Range |
| --- | --- |
| left side paint flow | 74–94 cc/min |
| right side paint flow | 61–98 cc/min |
| top surface paint flow | 110–167 cc/min |
| downdraft bell zone | 29–80 ft/min |
| downdraft reciprocator zone | 46–84 ft/min |
| air temperature | 66–91° F. |
| air humidity | 11–76% |

Figure 5A:
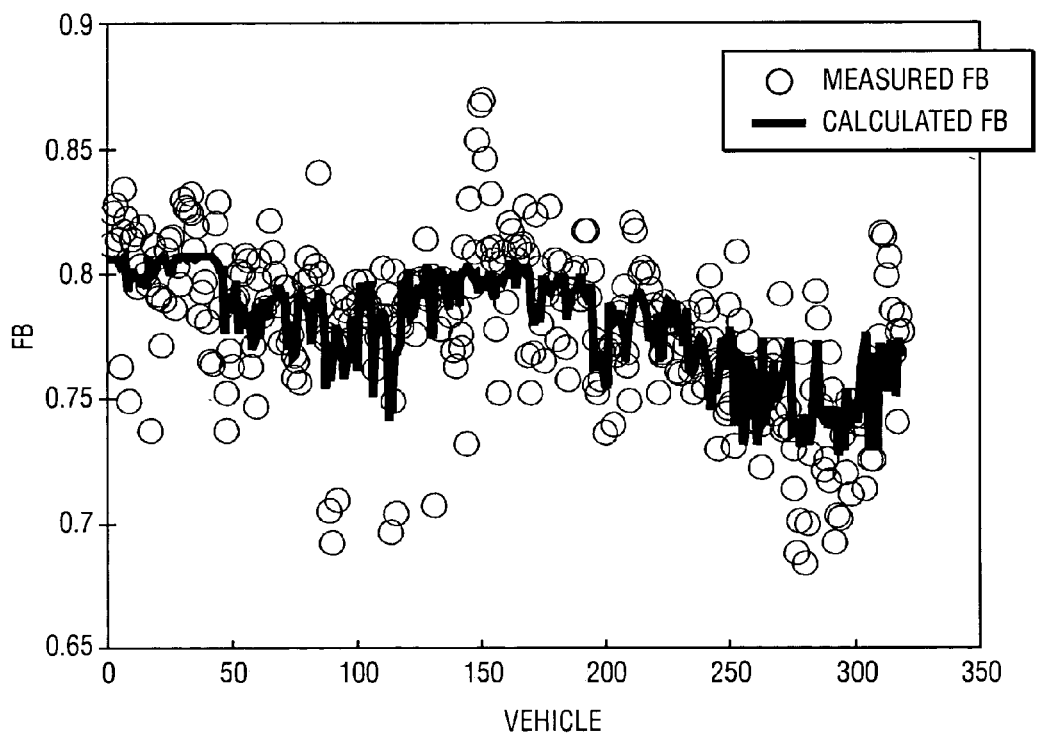
FIG. 5A is a plot comparing actual film thicknesses and thickness determined by the functional relation approximated by the neural network for the left side of a painted vehicle.
Figure 5B:
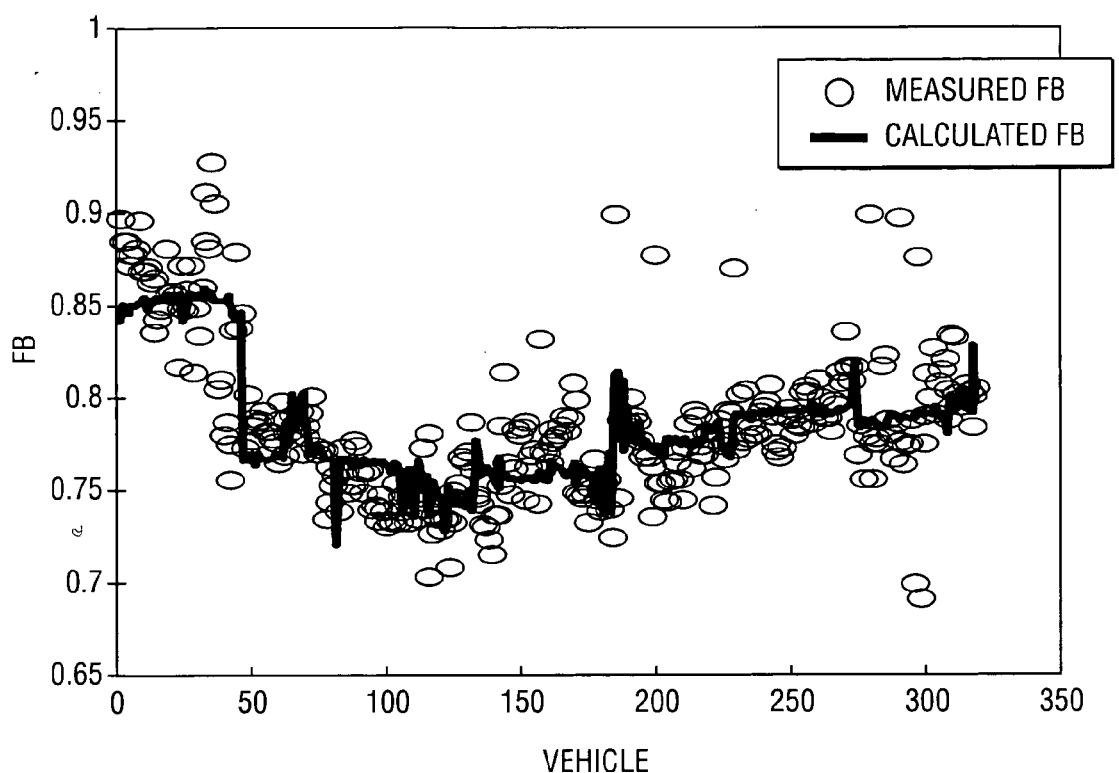
FIG. 5B is a plot comparing actual film thicknesses and thickness determined by the functional relation approximated by the neural network for the top surfaces of a painted vehicle.
Figure 6A:
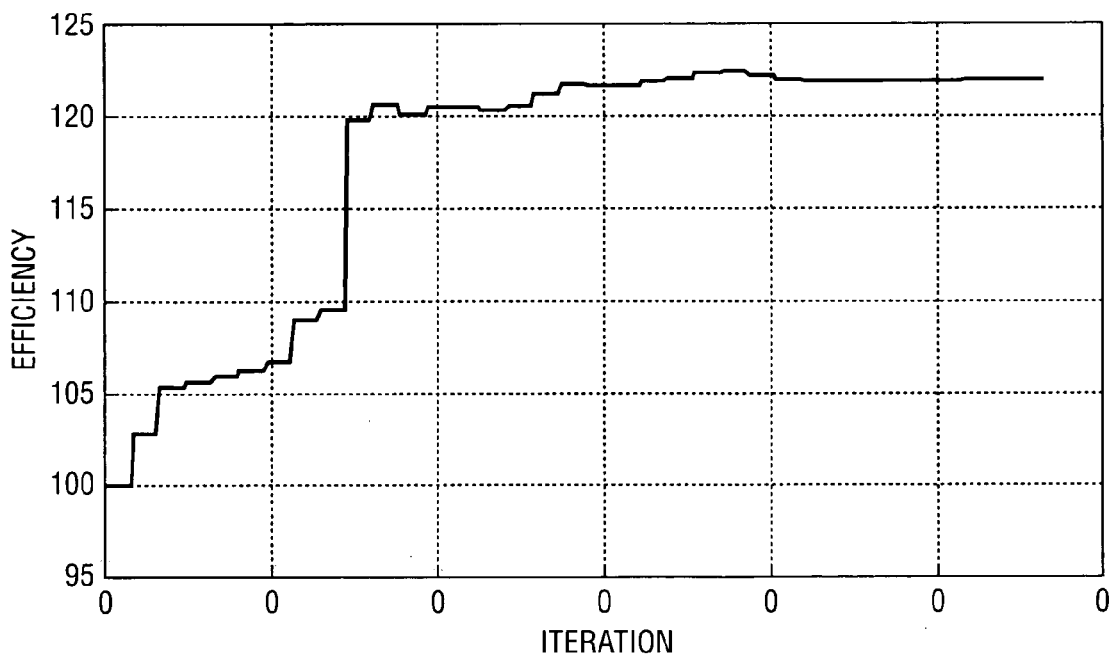
FIG. 6A is an optimization plot for the transfer efficiency utilizing the method of the invention.
Figure 6B:
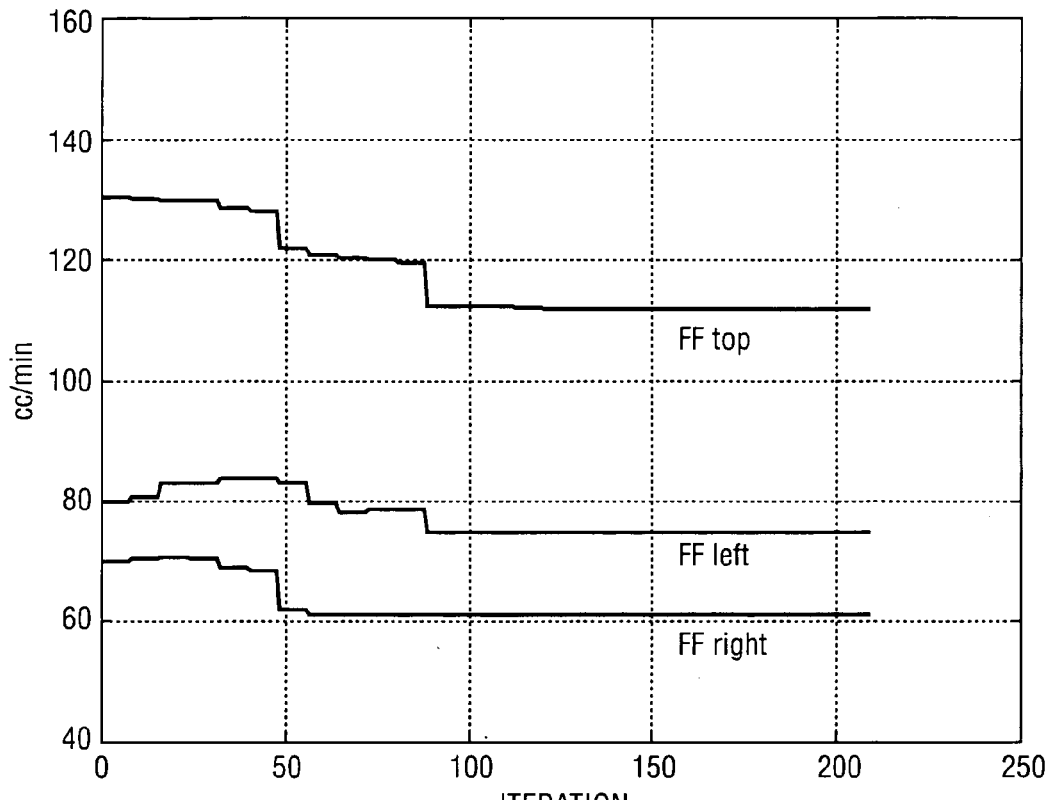
FIG. 6B is an optimization plot for the fluid flows utilizing the method of the invention.
Figure 6C:
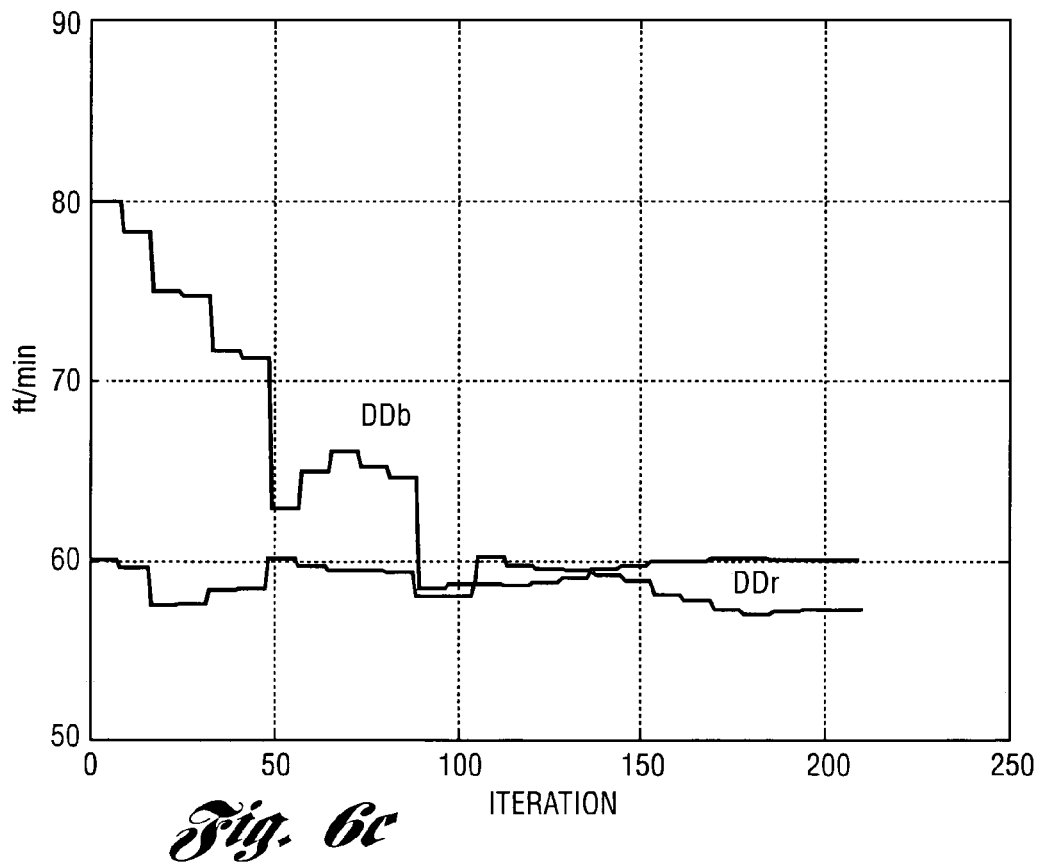
FIG. 6C is an optimization plot for the down drafts utilizing the method of the invention.

FIGS. 5A and 5B provide a comparison between actual data point and the functional relation approximated by the neural network. The data in this figure is a set of base coat production data (Silver Frost), fluid flow data, and air flow data (downdrafts in the bell and reciprocator zones) collected over a six-month period is provided. Agreement between the actual film build and the functional relationship is quite good. FIG. 6, provides optimization plots for the transfer efficiency, fluid flows, and the down drafts are provided as a function of iteration for this same set of data. In this optimization a was set to 0.985.

In another embodiment of the invention, a system for optimizing a painting process using the methods of the invention is provided. The system of this embodiment comprises a computer that is configured to define a functional relationship with a neural network having one or more neural layers between the set of paint processing parameters and a paint layer property. Additionally, the computer used in the system of the invention is further configured to optimize a paint optimization function that measures the efficiency of the painting process by adjusting the one or more paint processing parameters, the paint optimization function being a function of the paint layer property.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of optimizing a painting process for applying a paint layer on an article, the painting process controlled by a set of paint processing parameters, the method comprising:
   a) defining a functional relationship between the set of paint processing parameters and a paint layer property with a neural network having one or more neural layers to the one or more neural layers comprising a plurality of neural units having a plurality of neural network parameters,
   b) forming a paint optimization function that measures a combination of quality control parameters and paint transfer efficiency, the paint optimization function being a function of the paint layer property; and
   c) optimizing the paint optimization function by adjusting the one or more paint processing parameters utilizing the functional relationship defined in step a, wherein the functional relationship is defined by:
   obtaining a plurality of groups of values $P_k$ for the set of paint processing parameters and a value V for the paint layer property for each of the plurality of groups of values $P_k$ wherein k is an index number for each of the paint processing parameters with values from 1 to the number of processing parameters; and
   operating on each of the plurality of groups of values $P_k$ for the set of paint processing parameters with the neural network to provide an output O for each of the plurality of groups of values $P_k$; and
   adjusting the plurality of neural network parameters to minimize the differences between the output O and the value V for each of the one or more groups of values for a set of paint processing parameters to give a plurality of adjusted neural network parameters, and wherein the paint optimization function is given by:

$$J=\alpha \Sigma (FB-FT)^2+(1-\alpha)(\Sigma FF/\Sigma FB)$$

wherein FB is an average thickness calculated from the functional relationship, FT is a target average film thickness, FF is the amount of paint sprayed, and $\alpha$ is a weighting factor with the value between 0 and 1.

2. The method of claim 1 wherein the step of operating on each of the plurality of groups of values $P_k$ and the step of adjusting the plurality of neural network parameters is performed on a computer.

3. The method of claim 1 wherein the neural network operates on the plurality of groups of values $P_k$ through a first neural layer to give a first set of outputs $a_i$ defined by:

$$a_i = f^1(W^1_{i,k} P_k + b^2_j)$$

the outputs $a_i$ being operated on by a second neural layer to give output O defined by:

$$O = f^2(W^2_{j,k} P_k + b^2_j)$$

wherein $f^1$ is a transfer function for the first neural layer, $f^2$ is a transfer function for the second neural layer, i is an index number with values from 1 to the number of neurons in the first neural layer, j is an index number with values from 1 to the number of neurons in the second neural layer, $W^1_{i,k}$ are adjustable neural network parameters for the first layer, $W^2_{j,k}$ are adjustable neural network parameters for the second neural layer, $b^1_i$ are bias factors for the first neural layer, and $b^2_j$ are bias factors for the second neural layer.

4. The method of claim 1 wherein the paint layer property is the average thickness of the paint layer within a region of the article.

5. The method of claim 1 wherein one or more paint processing parameters are selected from the group consisting of applicator parameters, environmental parameters, applicator position parameters, paint material parameters, and combinations of the above.

6. The method of claim 5 wherein the applicator parameters are selected from the group consisting of fluid flow rates, shaping air flow rates, bell speeds, high voltage setting, and combinations of the above.

7. The method of claim 5 wherein the environmental parameters are selected from the group consisting of air downdrafts in the reciprocator zones, air downdrafts in the bell zone, air temperature, air humidity, and combinations of the above.

8. The method of claim 5 wherein the applicator position parameters are selected from the group consisting of target distance, angle to target, bell position, oscillation speed, oscillation stroke, bell separation, and combinations of the above.

9. The method of claim 5 wherein the paint material properties are selected from the group consisting of paint viscosity, paint temperature, paint resistivity, and combinations of the above.

10. The method of claim 5 wherein one or more paint processing parameters are selected from the group consisting of average fluid flow rate, downdrafts at the bell zones, downdrafts at the reciprocator zones, air temperature, air humidity, and combinations of the above.

11. The method of claim 1 wherein the step of optimizing the paint optimization function is performed on a computer.

12. A method of optimizing a painting process for applying a paint layer on an article, the painting process controlled by a set of paint processing parameters, the method comprising:

a) obtaining a plurality of groups of values $P_k$ for the set of paint processing parameters and a value V for the paint layer property for each of the plurality of groups of values $P_k$ wherein k is an index number for each of the paint processing parameters with values from 1 to the number of processing parameters; and b) defining a functional relationship between the set of paint processing parameters and a paint layer property by operating on each of the plurality of groups of values $P_k$ for the set of paint processing parameters with a neural network having one or more neural layers to provide an output O for each of the plurality of groups of values $P_k$ the one or more neural layers comprising a plurality of neural units having a plurality of neural network parameters;

c) adjusting the plurality of neural network parameters to minimize the differences between the output O and the value V for each of the one or more groups of values for a set of paint processing parameters to give a plurality of adjusted neural network parameters;

d) forming a paint optimization function that measures a combination of quality control parameters and paint transfer efficiency, the paint optimization function being a function of the paint layer property; and e) optimizing the paint optimization function by adjusting the one or more paint processing parameters utilizing the functional relationship defined in step d, wherein the neural network operates on a plurality of groups of values $P_k$ through a first neural layer to give a first set of outputs $a_i$:

$$a_i = f^1(W^1_{i,k} P_k + b^1_i)$$

the outputs $a_i$ being operated on by a second neural layer to give outputs O:

$$O = f^2(W^2_{j,k} P_k + b^2_j)$$

wherein $f^1$ is a transfer function for the first neural layer, $f^2$ is a transfer function for the second neural layer, i is an index number with values from 1 to the number of neurons in the first neural layer, j is an index number with values from 1 to the number of neurons in the second neural layer, $W^1_{j,k}$ are adjustable neural network parameters for the first layer, $W^2_{j,k}$ are adjustable neural network parameters for the second neural layer, $b^1_i$ are bias factors for the first neural layer, and $b^2_j$ are bias factors for the second neural layer.

13. The method of claim 12 wherein the paint optimization function is given by:

$$J = \alpha \Sigma (FB - FT)^2 + (1 - \alpha)(\Sigma FF / \Sigma FB)$$

wherein FB is an average thickness calculated from the functional relationship, FT is a target average film thickness, FF is the amount of paint sprayed, and a is a weighting factor with a value between 0 and 1.

14. The method of claim 13 wherein the optimization function given by J is minimized during the step of optimization.

15. The method of claim 13 wherein one or more paint processing parameters are selected from the group consisting average fluid flow rate, downdrafts at the bell zones, downdrafts at the reciprocator zones, air temperature, air humidity, and combinations of the above.

16. A system for optimizing a painting process for applying a paint layer on an article, the painting process controlled by a set of paint processing parameters, the system comprising a computer configured to:

define a functional relationship with a neural network having one or more neural layers between the set of paint processing parameters and a paint layer property, the one or more neural layers comprising a plurality of neural units having a plurality of neural network parameters; and optimize a paint optimization function that measures a combination of quality control parameters and paint transfer efficiency, by adjusting the one or more paint processing parameters, the paint optimization function being a function of the paint layer property, wherein the functional relationship is defined by:

obtaining a plurality of groups of values $P_k$ for the set of paint processing parameters and a value V for the paint layer property for each of the plurality of groups of values $P_k$ wherein k is an index number for each of the paint processing parameters with values from 1 to the number of processing parameters; and operating on each of the plurality of groups of values $P_k$ for the set of paint processing parameters with the neural network to provide an output O for each of the plurality of groups of values $P_k$; and adjusting the plurality of neural network parameters to minimize the differences between the output O and the value V for each of the one or more groups of values for a set of paint processing parameters and wherein the neural network operates on a plurality of groups of values $P_k$ through a first neural layer to give a first set of outputs $a_i$:

$$a_i = f^1(W^1_{i,k} P_k + b^1_i)$$

the outputs $a_i$ being operated on by a second neural layer to give outputs O:

$$O = f^2(W^2_{j,k} P_k + b^2_j)$$

wherein $f^1$ is a transfer function for the first neural layer, $f^2$ is a transfer function for the second neural layer, i is an index number with values from 1 to the number of neurons in the first neural layer, j is an index number with values from 1 to the number of neurons in the second neural layer, $W^1_{j,k}$ are adjustable neural network parameters for the first layer, $W^2_{j,k}$ are adjustable neural network parameters for the second neural layer, $b^1_i$ are bias factors for the first neural layer, and $b^2_j$ are bias factors for the second neural layer.

17. The system of claim 16 wherein the paint layer property is the average thickness of the paint layer within a region of the article.

18. The system of claim 16 wherein one or more paint processing parameters are selected from the group consisting of applicator parameters, environmental parameters, applicator position parameters, paint material parameters, and combinations of the above.

19. The system of claim 16 wherein one or more paint processing parameters are selected from the group consisting of average fluid flow rate, downdrafts at the bell zones, downdrafts at the reciprocator zones, air temperature, air humidity, and combinations of the above.

20. The system of claim 16 wherein the paint optimization function is given by:

$$J = \alpha \Sigma (FB - FT)^2 + (1 - \alpha)(\Sigma FF / \Sigma FB)$$

wherein FB is an average thickness calculated from the functional relationship, FT is a target average film thickness, FF is the amount of paint sprayed, and $\alpha$ is a weighting factor with $\alpha$ value between 0 and 1.

* * * * *